(No Model.)

A. F. PRESTON.
LASTING PINCERS.

No. 581,516. Patented Apr. 27, 1897.

WITNESSES:
A. D. Harrison
M. Bellamy

INVENTOR:
A. F. Preston
by Knight Brown & Quinby
Attys.

UNITED STATES PATENT OFFICE.

ALBERT F. PRESTON, OF BOSTON, MASSACHUSETTS, ASSIGNOR TO THE BUSELL LASTING MACHINE COMPANY, OF NASHUA, NEW HAMPSHIRE.

LASTING-PINCERS.

SPECIFICATION forming part of Letters Patent No. 581,516, dated April 27, 1897.

Application filed November 20, 1896. Serial No. 612,900. (No model.)

*To all whom it may concern:*

Be it known that I, ALBERT F. PRESTON, of Boston, in the county of Suffolk and State of Massachusetts, have invented certain new and useful Improvements in Lasting-Pincers, of which the following is a specification.

This invention relates to lasting-pincers, and has for its object to provide such improvements in the same as will enhance their efficiency and simplify them, whereby they will possess but few parts, which coöperate to produce the best results.

The invention consists of lasting-pincers embodying those features of construction and arrangement illustrated on the drawings, and now to be described in detail, and pointed out in the claims hereto annexed.

Reference is to be had to the annexed drawings, and to the letters marked thereon, forming a part of this specification, the same letters designating the same parts or features, as the case may be, wherever they occur.

Figure 1:
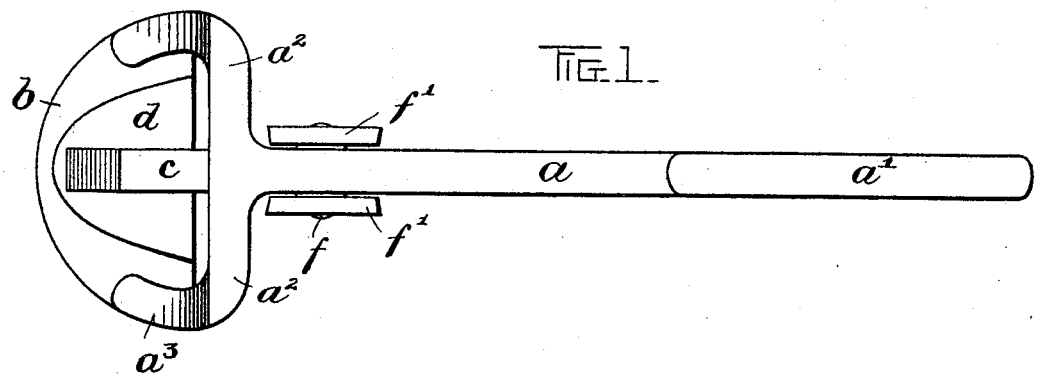
Figure 2:
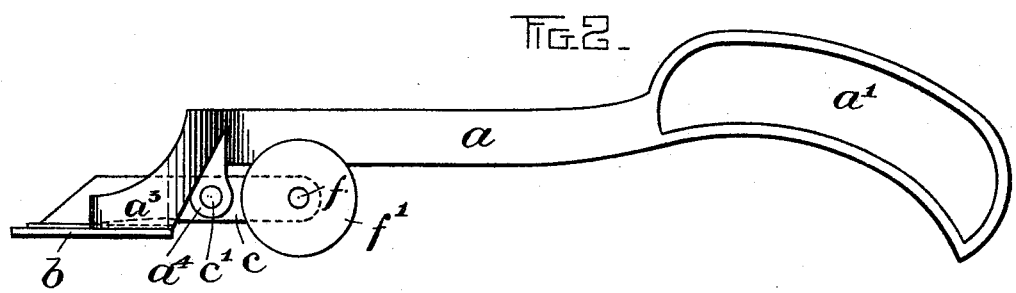
Figures 3, 4:
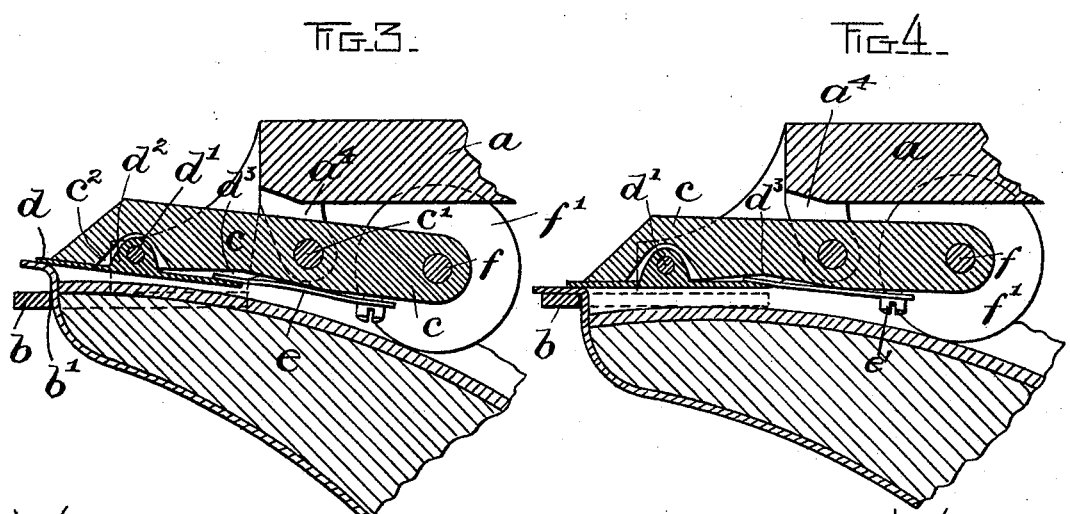

Of the drawings, Figure 1 is a plan view of my improved pincers. Fig. 2 is a side elevation of the same. Figs. 3 and 4, respectively, illustrate the pincers just before the upper is gripped between the jaws and after it is gripped by them.

In carrying out my invention I employ a single handle $a$, having a hand-grip $a'$ at one end and oppositely-extending arms $a^2$ $a^2$ at the other end. Each arm projects downward at $a^3$ to receive a plate $b$, which latter forms the concave jaw, being semicircular in shape, with a recess $b'$ to fit around the end of a last. The handle $a$ is likewise provided with downwardly-projecting ears or lugs $a^4$, between which is placed a short lever $c$, fulcrumed on a pintle $c'$, passing through said ears. The front end of the lever is provided with a recess $c^2$ to receive a lug or projection $d^2$ of a plate $d$, which plate forms the convex jaw and is hinged to the lever by a pintle $d'$, passing through the lever and through the ear $d'$. The lower surface of the lever $c$ is provided with a slight recess $d^3$ to permit the convex jaw to swing vertically on its axis, whereby the two jaws may remain in parallelism, there being, however, a strong flat spring $e$, secured to the lever by a screw $e'$ and having its forward end on top of the convex jaw, so as to cause it, except under very strong pressure, to remain parallel with the lever $d$ and at an angle to the concave jaw when the lever $d$ is tilted, as shown in Fig. 3.

In the rear end of the lever $c$ is journaled a pin $f$, provided on its ends with rollers $f'$ $f'$, which lie on either side of the handle.

In employing the pincers for drawing the toe of an upper taut over the last prior to the upper being secured to the insole the concave jaw is placed in front of the toe, as shown in Fig. 3, with the edges of the upper projecting between the jaws, the rollers being sufficiently heavy to hold the jaws apart. Then by pressing the handle downward, with the rollers resting upon the sole, the jaws are brought together, and then by pressing downward the handle still farther, with the rollers as a fulcrum, the edges of the upper are drawn taut over the last, as shown in Fig. 4.

It will be observed that as the edges of the upper are being gripped between the jaws that part of the convex jaw which is nearest the fulcrum or pintle $c'$ moves through the shortest arc, the distance of travel being about one-third the distance of travel of the outer edge of the said jaw, and that on account of the increased leverage the rear part of the convex jaw grips the upper against the concave jaw before the front part grips and with a greater force than the said front part. Hence by mounting the jaw movably on the handle and employing the spring $e$ the edges of the upper in the rear of the pintle $c'$ are gripped with a yielding pressure, though with a greater degree of force than the edges in front of the pintle, so that the last-named edges will slip between the jaws, while the first-mentioned edges will be practically locked, and, again, the rear part of the convex jaw not only grips the upper first, but begins to draw it taut over the last, and in this way compensates for the greater travel of the front part when the latter does grip.

The faces or gripping portions of the jaws lie in a plane at right angles to the direction of pull of the pincers, so that the leather is drawn over the inner edge of the concave jaw at right angles, so that the grip upon it is greatly multiplied.

Having thus explained the nature of the invention and described a way of constructing and using the same, though without attempting to set forth all of the forms in which it may be made or all of the modes of its use, I declare that what I claim is—

1. A lasting-pincers comprising a handle, a concave jaw secured thereto, a lever, a convex jaw pivoted to said lever, and a spring bearing against said convex jaw on one side of its pivot.

2. A lasting-pincers comprising a handle, a concave jaw rigidly secured thereto, a lever pivoted to said handle, a convex jaw hinged by a pintle to said lever, said convex jaw being arranged above said concave jaw, and means for causing the rear faces of said jaws to grip the upper with a great yielding pressure, and the front faces of said jaws to grip said upper with a less degree of pressure whereby the upper is allowed to slide through them.

3. A lasting-pincers comprising a concave jaw, and a convex jaw, said jaws being constructed and arranged to grip with their rear portions and begin to pull upon the upper with a yielding pressure, before the front portions grip the upper, when the toe of the upper receives a uniform pull.

4. A lasting-pincers comprising two levers pivoted together, a concave jaw secured to one of the levers, a convex jaw hinged to the other lever, and a spring inserted between the convex jaw and its lever.

In testimony whereof I have signed my name to this specification, in the presence of two subscribing witnesses, this 16th day of November, A. D. 1896.

ALBERT F. PRESTON.

Witnesses:
   A. D. HARRISON,
   P. W. PEZZUTTI.